J. J. CHARLEY & F. LAMPLOUGH.
SPRING SUSPENSION FOR VEHICLES.
APPLICATION FILED MAR. 26, 1912.
1,049,452.
Patented Jan. 7, 1913.
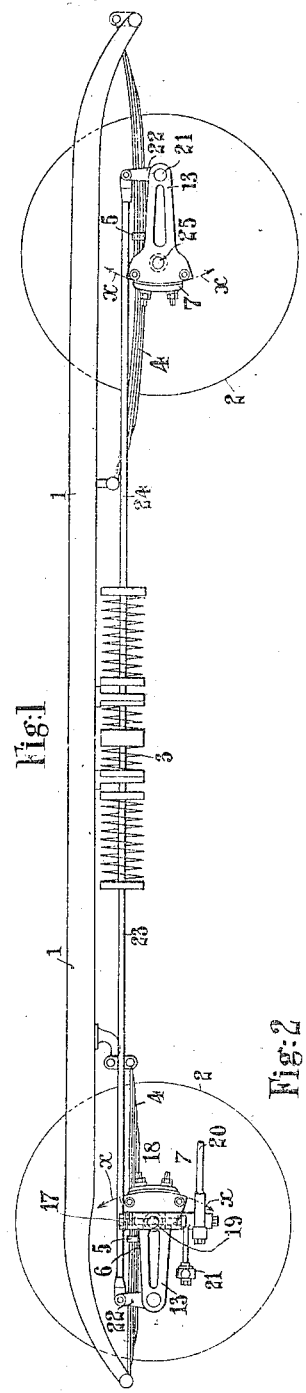
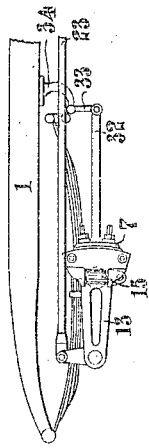
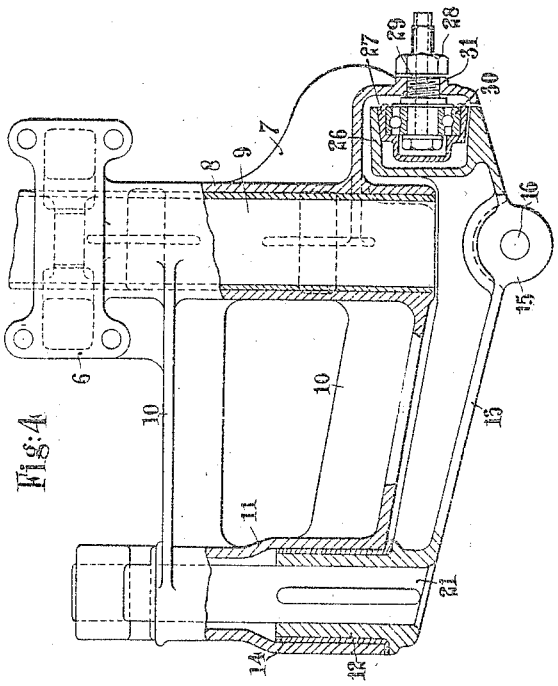
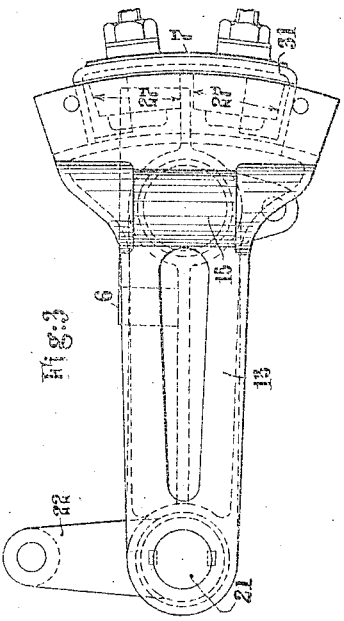
Witnesses
C. A. Walter
L. G. Anger
Inventors,
John J. Charley & Frederick Lamplough
By R. Madden
Attorney

UNITED STATES PATENT OFFICE.

JOHN JOSEPH CHARLEY, OF MALVERN, VICTORIA, AUSTRALIA, AND FREDERICK LAMPLOUGH, OF WILLESDEN JUNCTION, LONDON, ENGLAND; SAID LAMPLOUGH ASSIGNOR TO SAID CHARLEY.

SPRING SUSPENSION FOR VEHICLES.

1,049,452.  Specification of Letters Patent.  Patented Jan. 7, 1913.

Application filed March 26, 1912. Serial No. 686,443.

*To all whom it may concern:*

Be it known that we, JOHN JOSEPH CHARLEY and FREDERICK LAMPLOUGH, both subjects of the King of England, residing, respectively, at Malvern, Victoria, Australia, and Willesden Junction, London, England, have invented certain new and useful Improvements in Spring Suspension for Vehicles, of which the following is a specification.

This invention relates to spring suspension for vehicles for absorbing or reducing road shocks and the like, and comprises novel and efficient means whereby wheels of a vehicle which are each mounted on separate pivots may be resiliently suspended independently of the axle, or axles, and of the usual suspension springs or other axle supporting elements.

The object of the invention is chiefly to obviate the necessity for the use of pneumatic tires on motor road vehicles and generally to minimize shock to a far greater extent than is possible by the present known means for which purpose it is necessary to prevent rolling and pitching of the vehicle when encountering obstructions by causing each wheel to act independently and at the same time control the movements of another wheel or wheels. The principal cause of such rolling or pitching is due to each pair of wheels being rigidly mounted on or pivoted to a transverse axle so that when a wheel encounters an obstruction it not only passes over such obstruction but transmits a tipping or rolling motion to the vehicle owing to the transverse axle causing the corresponding wheel on the other side to be inclined proportionately to the wheel passing over the obstruction.

According to this invention the above action is rendered impossible and all motion imparted to a wheel passing over an obstruction is neutralized by the shock being primarily confined to that particular wheel, which in turn transmits the shock to another wheel or wheels, the shock being finally entirely eliminated by lifting the vehicle body evenly over its entire base or superficial area, and thus transforming the rolling or pitching motion into a slight undulating lifting movement over the whole.

Broadly stated the invention consists in a pivoted or articulated member or arm in or on which a running or road wheel is mounted, if necessary to have the necessary steering or turning movements in vertical or substantially vertical planes, this lever being positively connected to appropriate shock absorbing and normalizing devices and by the latter to another similar lever carrying another running or road wheel, the said shock absorbing and normalizing devices being appropriately of the kind described in the specification of prior patent to J. J. Charley No. 1013742, granted 2nd January 1912. The said pivoted member is guided by and is capable of rocking movements in a vertical or substantially vertical plane independently of a second member in rigid connection with a suspension spring or equivalent element connecting said second member to the vehicle frame or chassis or with an axle in such a manner that while permitting said pivotal member to rock in a vertical plane all latter play or torsional movements and strains are eliminated thus permitting the wheel to accommodate itself freely to obstructions which it may encounter and transmit the shock to another wheel while preventing all tendency to wabble or become unduly inclined relatively to the chassis.

An embodiment of the invention is represented in the accompanying drawings in which—

Figure 1 is a side elevation of a road vehicle chassis showing the invention applied thereto, with the shock absorbing and normalizing devices illustrated diagrammatically. Fig. 2 is a fragmentary side elevation of the front portion of the chassis showing the invention in slightly modified form. Fig. 3 is a side elevation of the wheel carrying member and appurtenant parts and Fig. 4 is a sectional plan view of Fig. 3, the two latter figures being drawn to a scale considerably enlarged relatively to Figs. 1 and 2.

In said drawings, 1 represents the chassis or frame of the vehicle, 2 the running wheels, and 3 the shock absorbing and normalizing system for a full description of which latter reference is directed to the aforesaid Letters Patent 1013742.

4 designates ordinary semi-elliptical laminated suspension springs which are attached as by straps 5 to a plate 6 forming part of a bracket 7 provided with a tubular boss 8 in which is housed one end of a transverse shaft or axle 9 extending to the opposite side of the vehicle where it carries a similar bracket on that side connected to a suspension spring. Extending from the boss 8 are two arms 10 integral at their outer ends with a bearing sleeve 11 in which is journaled a hollow boss 12 forming the fulcrum of an arm 13, a suitable liner or bushing 14 being shown as interposed between the sleeve and boss. In connection with the front or steering wheels of the vehicle the said arm 13 is provided on its exterior with a lug 15 having a vertical perforation 16 therein forming a socket in which is journaled the usual pintle 17 having pivoted thereon a fork 18 carrying a stub shaft 19 on which the running wheel is revolubly mounted, the said fork being extended below the lug as shown at the left hand side of Fig. 1 for connection of the usual steering rod 20 and connecting member 21 to the wheel on the opposite side of the vehicle.

Within the hollow boss 12 is keyed a spindle 21 extending to the rear of the bracket and having fixedly mounted thereon a vertical lever 22 to the free end of which is pivotally connected a rod 23 extending to the shock absorbing and normalizing system, another rod 24 extending from the latter to a similar lever 22 at the rear of the vehicle. The wheel supporting arm 13 and bracket 7 at this rear end of the vehicle are constructed similarly to those for the front end with the exception that the lug 15 and connections for mounting the wheel described may be dispensed with the wheel being revolubly mounted on a stub shaft 25 extending horizontally from the arm 13. Obviously if the vehicle is of such a character that no steering is required the construction described in connection with the rear wheels may be used also for the front wheels and inversely if it is desired to steer both front and rear wheels, the construction described for the front wheels will then also be applied to the rear wheels.

The arm 13 at its free end is provided with a curved guide or path formed by a bifurcated enlargement 26 of the arm in which engage or run two conical rollers 27 or other suitable elements carried by an extension 31 of the bracket 7 so that said free end of the arm may rise and fall relatively to said bracket in the directions of the arrows *x* Fig. 1, without lateral play or tendency to twist. The rollers 27 are shown as mounted in carriers 28 adjustable by means of screws 29 in relation to the path 26 for taking up wear or other purpose, the rollers being mounted on said screws 29 by means of ball bearings 30. One of said rollers will be in engagement with one interior wall of the path 26 as shown in Fig. 4, while the other roller will engage the opposite inner wall thereof.

It is also of advantage in order to further strengthen the structure and reduce or obviate torsional strains on the entire wheel suspension device to provide an additional connection between the bracket 7 and vehicle chassis which may be in the form of two pivotally connected levers or links 32 and 33, the one 32 being attached to the bracket and the other 33 to the frame or as shown to a spring hanger 34 in connection therewith.

What we claim as our invention and desire to secure by Letters Patent of the United States is:—

1. In a vehicle suspension, the combination with a vehicle frame, of a plurality of supporting members substantially fixed with relation to said frame, a member articulated at one end to each of said supporting members, a running wheel revolubly mounted adjacent the free end of each of said articulated members, and shock absorbing and normalizing means and connections intermediate a pair of articulated members at each side of the frame whereby pivotal movements of one articulated member are transmitted through said shock absorbing and normalizing means to another articulated member.

2. In a vehicle suspension the combination with a vehicle frame, of a plurality of supporting brackets substantially fixed with relation to said frame, an arm pivoted at one end to each of said brackets to be capable of rocking movements in a vertical plane, means adjacent the free end of each arm for supporting a running wheel, a shock absorbing and normalizing system intermediate a pair of brackets at front and rear of the vehicle, a lever in fixed relation to said pivoted arm and connections between said levers and the shock absorbing and normalizing system.

In witness whereof we have signed this specification in the presence of two witnesses.

JOHN JOSEPH CHARLEY.
FREDERICK LAMPLOUGH.

Witnesses:
 EVANGELINE HAMPTON,
 EUSTACE H. BARKER.